United States Patent [19]
Ikebe et al.

[11] 3,916,199
[45] Oct. 28, 1975

[54] ISOCOUNT SCINTILLATION SCANNER WITH PRESET STATISTICAL DATA RELIABILITY

[75] Inventors: Jun Ikebe, Tokyo; Hiroshi Yamaguchi, Funabashi, both of Japan; Oscar Akio Nawa, Sao Paulo, Brazil

[73] Assignee: Hitachi Medical Corporation, Tokyo, Japan

[22] Filed: Aug. 28, 1973

[21] Appl. No.: 392,239

[30] Foreign Application Priority Data
Aug. 29, 1972 Japan .......................... 47-85864
Aug. 29, 1972 Japan .......................... 47-85865
Sept. 29, 1972 Japan .......................... 47-97188

[52] U.S. Cl. ........................... 250/369; 250/363
[51] Int. Cl. ................................. G01t 1/20
[58] Field of Search ............ 250/327, 363, 366, 369

[56] References Cited
UNITED STATES PATENTS
3,509,341  4/1970  Hindel et al. ................. 250/366
3,777,145  12/1973  Brunnett et al. ............ 250/363 X Primary Examiner—Archie R. Borchelt
Attorney, Agent, or Firm—Thomas E. Beall, Jr.

[57] ABSTRACT

A scintillation detector scans an object such as a live body along horizontal straight scanning lines in such a manner that the scintillation detector is stopped at a scanning point during the time interval T required for counting a predetermined number of N pulses.

The rate $R_X = N/T$ is then calculated and the output signal pulses the number of which represents the rate R or the corresponding output signal is used as the recording signal for forming the scintigram.

In contrast to the usual scanner, the isocount scanner scans an object stepwise in order to gather data with statistically uniform reliability.

11 Claims, 8 Drawing Figures

ISOCOUNT SCINTILLATION SCANNER WITH PRESET STATISTICAL DATA RELIABILITY

BACKGROUND OF THE INVENTION

The present invention relates to a scintiscanner for scanning an object, such as a live body, along horizontal straight scanning lines in order to detect the radioactivity concentration at each scanning point, thereby obtaining a scintigram displaying a radioactivity distribution within the object.

In the conventional scintiscanners, a scintillation detector is caused to scan at a fixed speed and a light source interlocked with the detector is flashed in response to every output pulse, so as to sequentially form image elements of the scintigram through a slit. The output pulses conform to the Poisson process because of the property of radioactive rays, so that the pulse intervals are random. The positional fluctuation of the image elements is large in a place where the radioactivity concentration is low. This is a major cause for rendering the scintigram indistinct.

Assuming now that the radioactive ray sources are distributed within an $x$–$y$ plane and that the concentration of the sources as measured by the output of the scintillation detector is $\lambda(x, y)$, the standard deviation $\sigma$ of the intervals of the pulses becomes $\sigma = 1/(x, y)$. On the other hand, when the detector is kept stationary at a certain point, the time necessary for counting $N$ pulses at this point is given by $T$, and the counting rate $R$ becomes $R = N/T$. The counting rate $R$ is a quantity which varies statistically, and the expected value $E(R)$ and the standard deviation $\sigma_{(R)}$ of $R$ are evaluated by the use of the Poisson nature of the pulses, as follows:

$$E(R) = \lambda(x, y)$$

and $$\sigma(R) = \lambda(x, y)/\sqrt{N}$$

Accordingly, the coefficient or variation $\epsilon(R)$ of R becomes:

$$\xi(R) = \sigma(R)/E(R) \cong 1/\sqrt{N}$$

Therefore, if the counted value N in each measurement is maintained constant over the entire picture, the coefficient of variation of the counting rates becomes independent of the place and constant. This signifies that in the formation of the scintigram, considering the visual characteristic of a viewer the variation of the counting rates (as corresponds to $\sigma(R)$ ) in a place where the concentration is high (where $E(R)$ is large) may be large to some extent, whereas the variation is a place where the concentration is low (where $E(R)$ is small) becomes small in proportion thereto.

One of the objects of the present invention is therefore to provide a scintiscanner in which the rate $R = N/T$ is derived, where $N$ is a predetermined number of pulses counted at each scanning spot and $T$ is the time interval required for counting said predetermined number of $N$ pulses, so that $R$ pulses or the analog signal representing the rate $R$ is applied as the recording signal resulting in a scintigram recorded with a higher degree of accuracy.

Further object of the present invention is to provide a scintiscanner which will not make a careful observation nor produce any output recording signal when the scintillation detector is scanning a point in the background of an object where the radioactivity concentration is low so that the scintillation detector is displaced to the next scanning point at the maximum scanning speed; the detector is indexed to the next scanning line when the limit of a scanning line is reached. This expedient allows considerable saving of scanning time for organs not necessarily convex, as the case of liver.

In a second version, when the radioactivity concentration detected at one or some predetermined number of scanning points is less than a predetermined level, the scintillation detector is moved to the next scanning line even before it reaches the end of a scanning line, whereby the overall scanning time is considerably reduced. This process is useful for convex organs, such as the case of brain.

The above and other objects, features and advantages of the present invention will become more apparent from the following description of some preferred embodiments thereof taken in conjunction with the accompanying drawing.

DESCRIPTION OF THE PREFERRED EMBODIMENT

Figure 3:
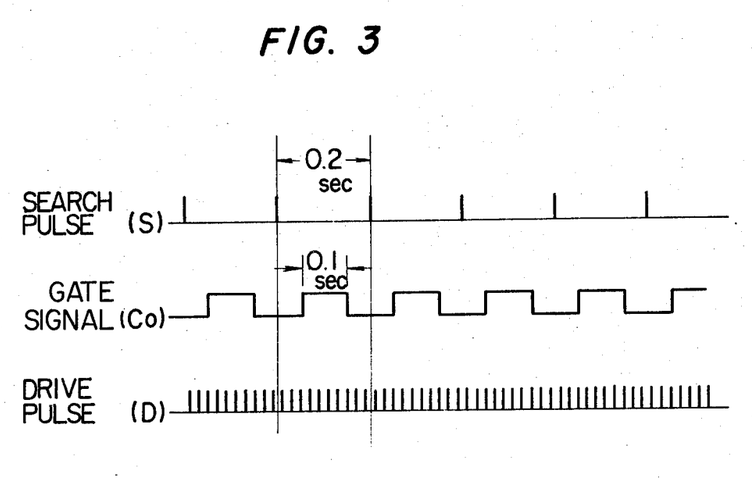
FIG. 3 illustrates the control pulses used in the first embodiment.
Figure 4:
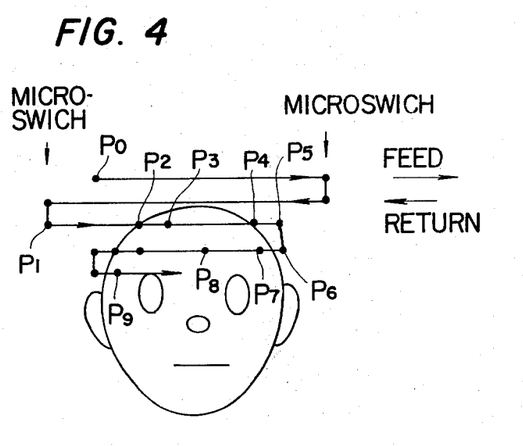
FIG. 4 is the diagram used for the scanning method.

First referring to FIG. 4, the scanning method is described. The transverse scanning is started from the starting point $P_0$ to the right, and at the right end (microswitch) the scanning line is longitudinally moved and then returned to the left as indicated by the sequence of points $P_0 \rightarrow P_1 \rightarrow P_2 \rightarrow P_9 \text{-----}$. A scintillation detector is driven by a pulse motor PM. More particularly during one pulse-spacing of 0.2 seconds of search pulses S shown in FIG. 3, driving pulses D for feeding the scintillation detector 3mm are generated. In other words, the scintillation detector is stopped after ever 3mm move. A light source for recording (not shown) is also driven in synchronism with the scintillation detector.

Figure 1:
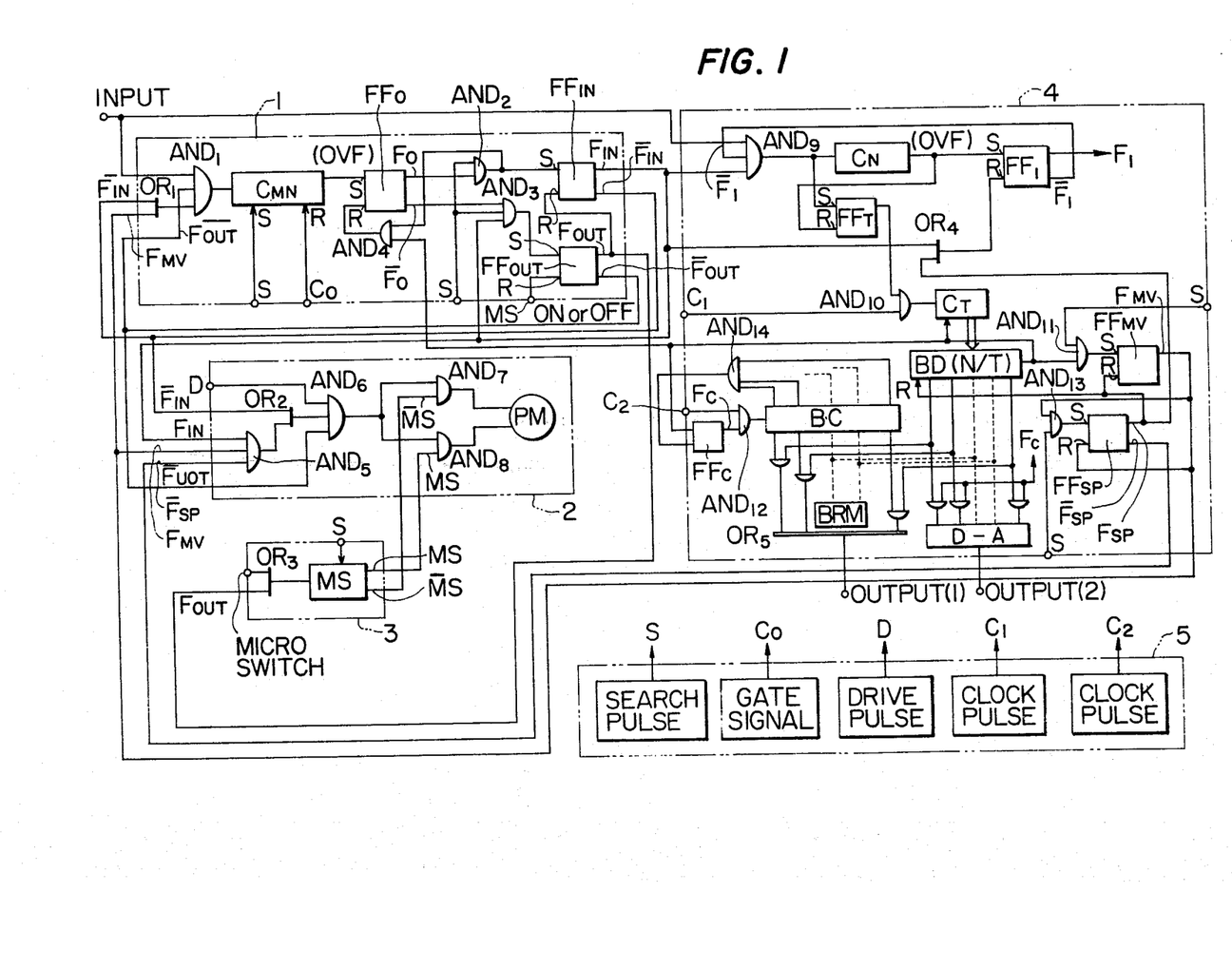
FIG. 1 is the circuit diagram of a first embodiment of the present invention.
Figure 2:
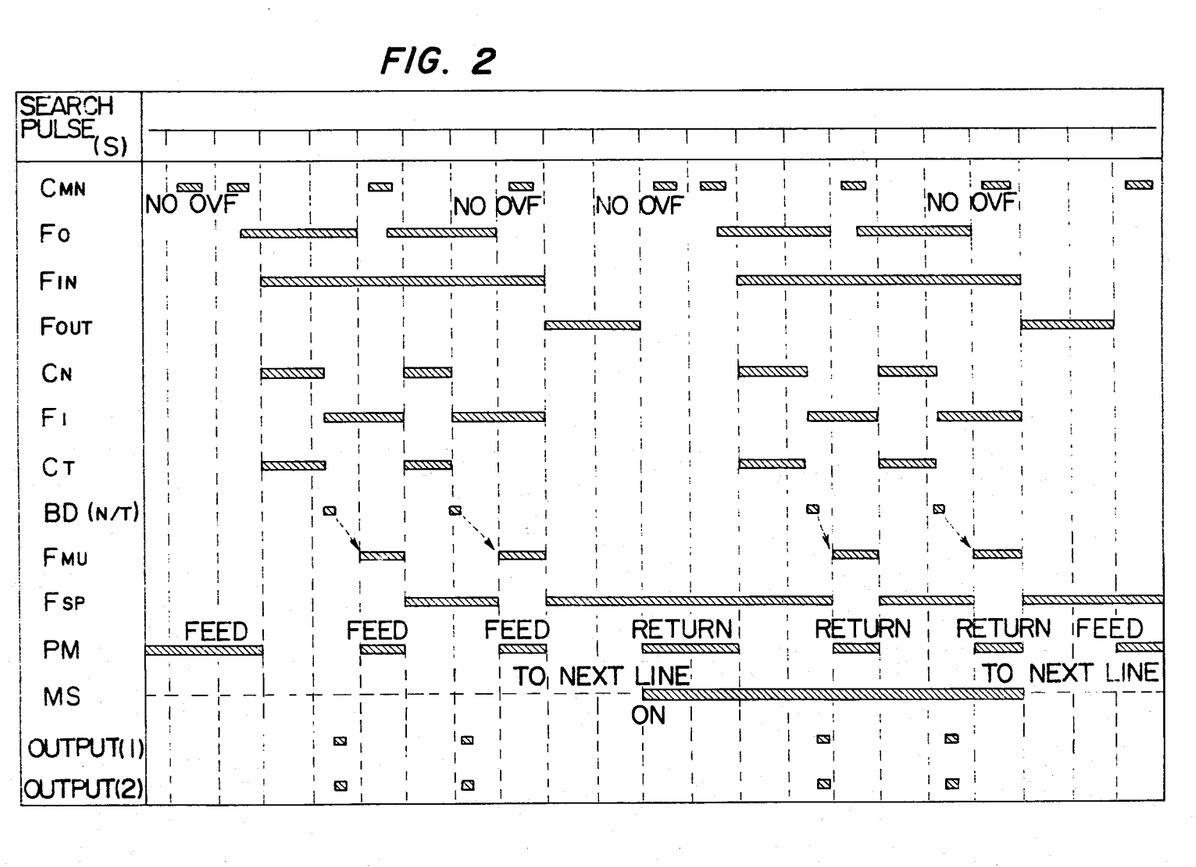
FIG. 2 is the time chart used for the explanation of the mode of operation thereof.

FIRST EMBODIMENT, FIGURES 1, 2 and 3

Referring to FIG. 1, AND circuits are designated by $AND_1 \sim AND_{14}$; OR circuits, by $OR_1 \sim OR_5$; and flip-flops, by $FF_0$, $FF_{IN}$, $FF_{OUT}$, etc.

The first embodiment of the scintiscanner in accordance with the present invention comprises a monitor circuit 1, a pulse motor drive control circuit 2, a feed control circuit 3, an imaging circuit 4 for setting a predetermined number of pulses, measuring the time, calculating the count rate R, outputting the recording signals, and control pulse generator circuits 5.

In the monitor circuit 1, the pulses from the scintillation detector are counted by the monitor counter $C_{MN}$ during a time interval of 0.1 seconds within the pulse spacing of 0.2 seconds of the search pulses S as shown in FIG. 3. When the pulses derived from the scintillation detector reach a predetermined number, for example, 10, the monitor counter $C_{MN}$ gives the overflow signal OVF in response to which the flip-flop $FF_0$ is turned on ($F_0 = 1$) so that the flip-flop $FF_{IN}$ is also turned on ($F_{IN} = 1$). The instant when the flip-flop $FF_{IN}$ is driven into the state $F_{IN} = 1$ is synchronized with the search pulse S.

The pulse motor PM is driven by the driving pulses D, moving the scintillation detector at the rate of 3mm/0.2 seconds as described above, however when $F_{IN} = 1$ the pulse motor PM is stopped. As a result, the scintillation detector is also stopped.

The longitudinal feed control circuit 3 gives the signal for causing the scintillation detector to move longitudinally in response to the signal $F_{OUT}$ or the signal from a microswitch. In the instant embodiment, the signal $F_{OUT}$ is generated in synchronism with the first search pulse after the non-overflow of the monitor counter $C_{MN}$ of the monitor circuit 1. That is, the flip-flop $FF_0$ remains in the reset state ($\overline{F_0} = 1$) so that the AND gate $AND_3$ is opened in response to the next search pulse and the flip-flop $FF_{OUT}$ is turned on ($F_{OUT} = 1$). Simultaneously the flip-flop $FF_{IN}$ is reset ($F_{IN} = 0$).

Microswitches (not shown) are positioned on both ends of each scanning line so that the longitudinal feed of the scintillation detector may be controlled also in response to the signals from the microswitches.

In the circuit 4, a counter $C_N$ starts counting the input pulses from the scintillation detector in response to the signal $F_{IN} = 1$ generated when the flip-flop $FF_{IN}$ of the monitor circuit 1 is turned on. A predetermined number is set into the counter $C_N$ so that when the number of input pulses reaches this predetermined number of, for example, 1024 the counter $C_N$ gives the overflow signal. A timer $C_T$ is adapted to count the time interval while the counter $C_N$ is counting the input pulses. The rate $R = N/T$ is derived by a binary divider BD, and a binary rate multiplier BRM gives the output signal at the output terminal 1 which consists of a number of pulses proportional to the rate $R = N/T$. The output signal is applied to the recorder (not shown) as the imaging signal. The rate $R = N/T$ is converted into analog signal by a digital-to-analog converter D-A and fed to the recorder through an output terminal 2 as the imaging signal. That is, the recorder may receive not only a digital but also an analog imaging signal, both of which represent the rate $R = N/T$. The circuit 4 further includes a binary counter BC for the binary rate multiplier BMR.

Next the mode of operation is described in more detail hereinafter. Prior to the operation every flip-flop is reset. The drive pulses D are supplied to the pulse motor PM to start the scanning from the starting point $P_0$ (see FIG. 4), and the pulse signals from the scintillation detector are fed to the input terminal of the monitor circuit 1 so that in response to the search pulses S and the gate signal $C_0$ the monitor counter $C_{MN}$ counts the input pulses during a time interval of 0.1 seconds within a time interval of 0.2 seconds during which the scintillation detector is fed 3mm as shown in FIG. 2. When the starting point $P_0$ is located outside of an object as shown in FIG. 4, the count rate is generally low and is less than the predetermined number of 10 in $C_{MN}$ so that no overflow signal OVF is generated. As a result all of the flip-flops in the monitor circuit 1 remain in the same state so that the pulse motor PM is continuously driven to feed the scintillation detector at a rate of 3mm/0.2 seconds, but the circuit 4 gives no output imaging signal.

When the scintillation detector approaches the point $P_2$ close to the object as shown in FIG. 4, the number of pulses counted by the monitor counter $C_{MN}$ reaches the predetermined number 10 within 0.1 seconds so that the overflow signal OVF is generated. In response to the overflow signal OVF the flip-flop $FF_0$ is driven into the state where $F_0 = 1$ and in response to the next search pulse S the flip-flop $FF_{IN}$ is driven into the state $F_{IN} = 1$. In response to the signal $F_{IN} = 1$ the pulse motor PM is stopped so that the feed of the scintillation detector is interrupted.

In response to the signal $F_{IN} = 1$ the counter $C_N$ in the imaging circuit 4 starts counting the pulses derived from the scintillation detector. In this case the scintillation detector remains in the position $P_2$. When the number of pulses counted by the counter $C_N$ reaches the present number 1024, the overflow signal is generated. The timer $C_N$ starts counting the pulse to the time the overflow signal is generated. The coefficient of variation of the rate $R$ is given, as mentioned above, by $$\epsilon(R) = 1/\sqrt{N} = 1/\sqrt{0024} \approx 0.03$$

This means by the probability theory that the probability of the rate $R$ being within a tolerance of ±3 percent of a true value is 68 percent. When $N = 4400$ the probability is improved to 95 percent. The preset number $N$ may be varied depending upon a desired degree of accuracy in measurement.

The output signal, the rate $R = N/T$, controls the gates of the binary rate multiplier BRM so that a number of pulse proportional to $R$ appears at the output terminal 1. These pulses are fed into the recorder as the imaging signals. That is, in response to the $R$ pulses, a light source in the recorder is flashed upon a film for exposure. Alternatively, a dot printing mechanism is actuated to print dots over a recording paper, thereby forming a scintigram.

At the same time, the output signal R of the binary divider BD is converted by the digital-to-analog converter D-A into analog signal which is derived from the output terminal 2. Therefore the recorder may selectively receive the digital or analog output signal.

As soon as the output signals are transmitted to the recorder from the output terminals 1 or 2, the flip-flop $FF_{MV}$ is set in response to the next search pulse S into the state $F_{MV} = 1$. In response to the signal $F_{MV} = 1$, the pulse motor PM is driven again so that the scintillation detector starts to move from the point $P_2$. The flip-flop $FF_{SP}$ will be turned on when $F_{MV} = 1$ in response to the next search pulse S, then the detector will stop at the next scanning point.

When the scintillation detector is moving from the point $P_4$ to $P_5$ (see FIG. 4), the overflow signal OVF is not generated because the pulses counted by the counter $C_{MN}$ do not reach the predetermined number during the time interval of 0.1 seconds. Therefore, the scintillation detector stops at the point $P_5$. Since the overflow signal is not generated when $F_{IN} = 1$, in response to the search pulse S and the output signal $\overline{F_0} = 1$ of the flip-flop $FF_0$ the AND gate $AND_3$ is opened so that the flip-flop $FF_{OUT}$ is driven into the state $F_{OUT} = 1$.

In response to the signal $F_{OUT} = 1$ the pulse motor PM stops and the longitudinal feed control circuit 3 is so actuated as to cause the scintillation detector to move from the point $P_5$ to the point $P_6$ during two search pulse spacings (= 0.4 seconds). When the scintillation detector reaches the point $P_6$ the output signal of the longitudinal feed control circuit 3 changes from $MS = 1$ to $\overline{MS} = 1$. Since $\overline{F_{OUT}} = 0$ when $F_{OUT} = 1$, the counting of the pulses by the monitor counter $C_{MN}$ is interrupted when the longitudinal feed control is activated.

In response to the signal $MS = 1$ the flip-flop $FF_{OUT}$ is reset and the drive pulses D are applied to the retrace terminal of the pulse motor PM so that the scintillation detector is returned to the left. When the scintillation detector moves from the point $P_6$ to the point $P_7$, the monitor counter $C_{MN}$ does overflow so that the flip-flop $FF_{IN}$ is driven into the state $F_{IN} = 1$ and the detector stops at the point $P_7$ and the measurement is proceeded. In the like manner the scintillation detector stops every 3mm and then moves to the next scanning point after the digital or analog signal representing the rate $R$ has been delivered to the recorder.

Figure 5:
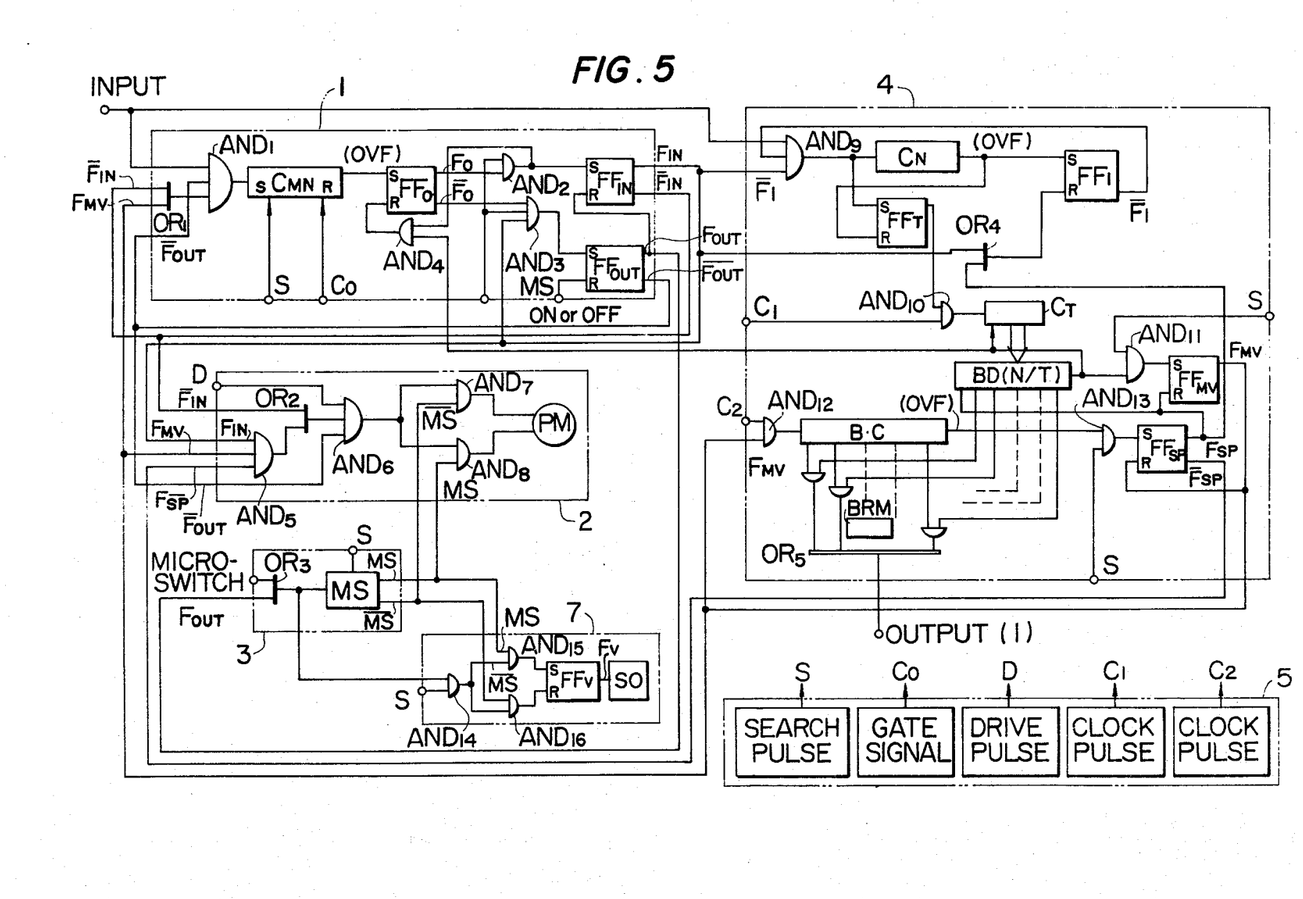
FIG. 5 is the circuit diagram of a second embodiment of the present invention.
Figure 6:
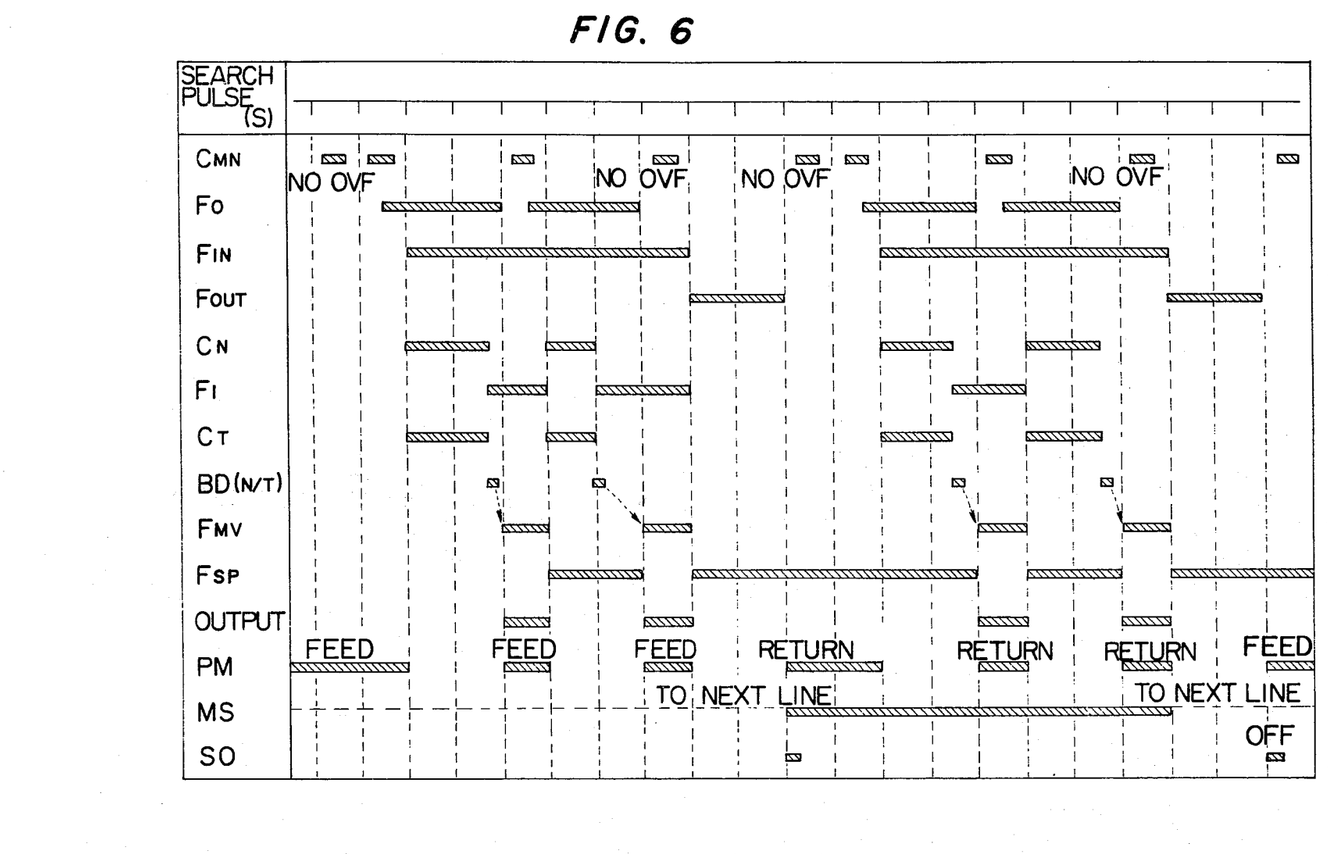
FIG. 6 is the time chart used for the explanation of the mode of operation thereof.

SECOND EMBODIMENT, FIGURES 5 and 6

The second embodiment shown in FIG. 5 is substantially similar to the first embodiment except that the former feeds the output signal representing the rate $R$ to the recorder during a time interval of 0.2 seconds during which the scintillation detector is fed 3mm. According to FIG. 5 the rate $R_N$ measured at the point $P_2$ in FIG. 4 is recorded on the recording film or paper in the space between the point $P_2$ and $P_3$, whereas the rate $R$ measured at the point $P_7$ is recorded on the recording film or paper in the space between the point $P_7$ and $P_8$. As a result the recordings on the scanning line including the point $P_2$ would be deviated by 3mm from those on the scanning line including the point $P_7$, would it not for the recording correction circuit 6 that corrects this deviation. The solenoid SO of the recording correction circuit 6 is adapted to displace, in response to the output signal MS or $\overline{MS}$ of the longitudinal feed control circuit 3, the light source of the recorder by 3mm.

Figure 7:
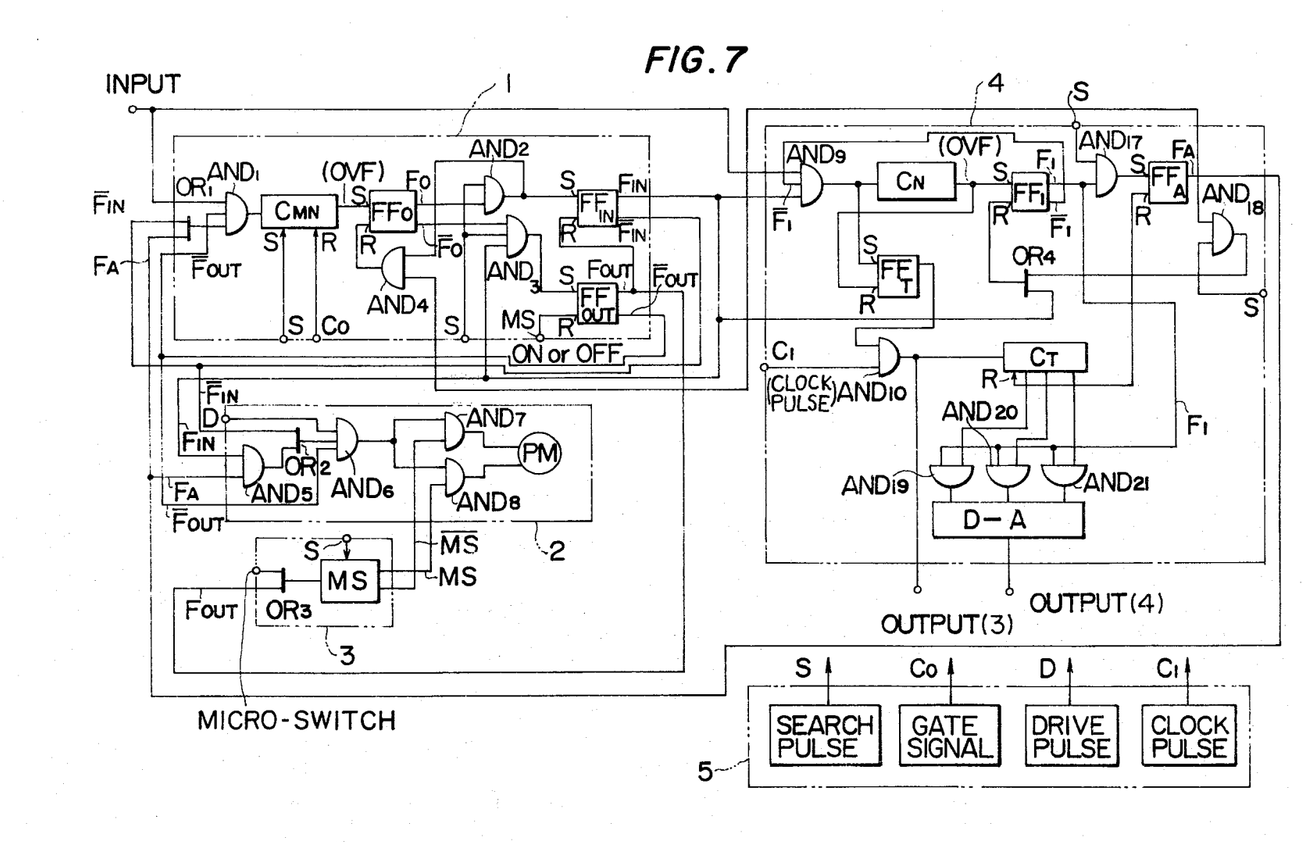
FIG. 7 is the circuit diagram of a third embodiment of the present invention.
Figure 8:
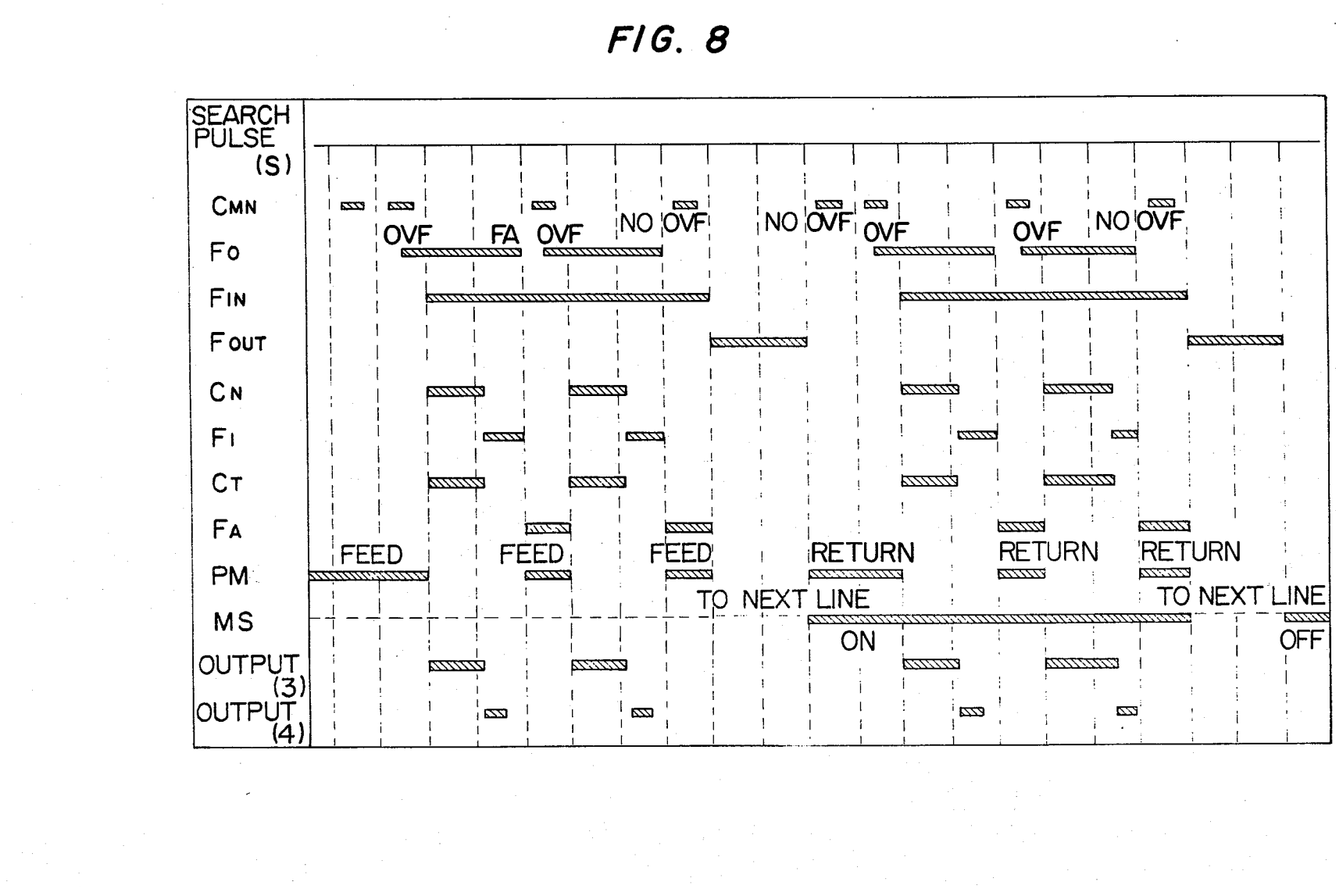
FIG. 8 is the time chart thereof.

THIRD EMBODIMENT, FIGURES 7 and 8

The third embodiment shown in FIG. 7 is the circuit diagram in which the time interval $T$ in terms of clock pulses required for counting a predetermined number of pulses, for example 1024, is derived as the digital or analog output signal. In the recorder the digital or analog output signal is converted into the recording signal which is in inverse proportion to the radioactivity concentration. That is, in response to the output signal $F_{IN} = 1$ of the flip-flop $FF_{IN}$ the counter $C_N$ of the imaging circuit 4 starts counting the pulses from the scintillation detector and gives the overflow signal when the number of pulses counted reaches a predetermined number, for example 1024. During the time interval while the counter $C_N$ is counting the input pulses, the clock pulses $C_1$ are applied to the output terminal 3 through the AND gate $AND_{10}$. The output signal of a timer $C_T$ representing the time interval $T$ from the time the counter $C_N$ starts counting the pulses to the time it gives the overflow signal is converted into the analog signal by the digital-to-analog converter D-A and applied through the output terminal 4 to the recorder. The recorder converts the analog output signal into the recording signal which is in inverse proportion to the radioactivity concentration. This results in reversed scintigrams, that is, in the case of a human liver, for example, the affected parts and the background will be dark and other parts clear.

According to the present invention the first embodiment may be combined with the third embodiment so that four different output signals may be derived from the output terminals 1, 2, 3 and 4. In other words the recorder may selectively receive the digital or analog output signal representing the rate $R$ or the digital or analog output signal representing the time interval $T$.

According to the present invention, in order to obtain the radioactivity concentration of an object, the rate $T = N/T$ is measured at each scanning point with $N$ being a preset number and $T$ a variable. Therefore the measurement with a higher degree of accuracy may be made. Furthermore the monitor circuit is provided in order to interrupt the output recording signal at a scanning point where the radioactivity concentration is less than a predetermined level. At the same time the pulse motor is continuously driven at the maximum speed so that the scintillation detector is moved past the scanning point to the next scanning point. Moreover after a measurement was proceeded and if the overflow signal of the monitor circuit is not derived successively a predetermined times, for example once or twice, the scanned point is considered to be gotten out of the object so that the longitudinal feed of the scintillation detector is effected even before the detector reaches the microswitch disposed at the end of the scanning line. As a result the unrequired scanning of the area outside of the object may be eliminated so that the overall scanning time may be considerably reduced.

Furthermore according to the present invention the digital or analog signal representing the rate $R$ or the digital or analog signal representing the time interval $T$, in terms of clock pulses, required for counting a predetermined number $N$ of pulses from the scintillation detector may be selectively applied to the recorder.

What is claimed is:
1. A scintillation scanner comprising
   a. scintillation detector means for detecting the radioactivity concentration so as to generate electrical pulses the number of which is in proportion to the detected radioactivity concentration,
   b. means for moving said scintillation detector means along a scanning line over an object,
   c. monitor circuit means for counting the pulses from said scintillation detector during a predetermined time interval in synchronism with the detector means movement, and generating a first overflow signal when the number of pulses counted by said monitor circuit means reaches a first preset number,
   d. means for deactivating said detector moving means and monitor circuit means when the number of pulses counted by said monitor circuit means reaches said first preset number,
   e. counter means for giving a second overflow signal when the number of pulses from said scintillation detector means stopped at a scanning point reaches a second predetermined number $N$,
   f. timer means responsive to said second overflow signal for measuring the time interval $T$ required for counting said second predetermined number of $N$ pulses by said counter means, g. binary divider means for calculating the rate $R = N/T$, and h. means for activating said monitor circuit means and said detector moving means again at the end of said calculation of the signal representing said rate $R = N/T$, whereby in response to said calculated rate $R$ a scintigram is formed.

2. A scintillation scanner as defined in claim 1 further comprising a drive control circuit means for driving continously said detector moving means at maximum speed when the number of pulses counted by said monitor circuit means during the movement of said scintillation detector means is less than said first predetermined number, stopping said detector moving means at a point when the number of pulses counted by said monitor circuit means exceeds said first preset number, and indexing said detector means when it reaches the end of a scanning line.

3. A scintillation scanner as defined in claim 1 further comprising a longitudinal feed control circuit means for indexing said scintillation detector means to the next scanning line, when said monitor circuit means does not generate said first overflow signal successively for a predetermined number of said predetermined time intervals so that the scanning point is considered to be located outside of said object, before said scintillation detector reaches a microswitch disposed at the end of the scanning line.

4. A scintillation scanner as defined in claim 1 further comprising a binary rate multiplier means for producing a digital signal having a number of pulses proportional to said rate $R$ calculated by said binary divider means.

5. A scintillation scanner as defined in claim 1 further comprising a digital-to-analog converter means for converting the output signal of said binary divider means into an analog signal representing said rate $R$.

6. A scintillation scanner as defined in claim 1 wherein the timer means produces clock pulses the number of which represents said time interval $T$ and is a recording signal.

7. A scintillation scanner as defined in claim 6 further comprising a digital-to-analog converter for converting said clock pulses into a corresponding analog signal.

8. A scintillation scanner comprising:

a. scintillation detector means for detecting radioactivity concentration and generating electrical pulses, the number per unit time of which is in proportion to the detected radioactivity concentration, b. detector moving means for moving said detector means along a scanning line at a predetermined scanning speed, c. electrical circuit means responsive to said electrical pulses generated by said detector means for
 1. operating said detector moving means to slow said detector means from said scanning speed whenever the detected radioactivity concentration is above a predetermined level,
 2. thereafter producing a signal output correlated to the detected radioactivity concentration,
 3. operating said detector moving means to return said detector means to said scanning speed after producing said signal output, and
 4. automatically repeating said functions 1–3 in order.

9. The scintillation scanner of claim 8, wherein said detector moving means is a motor.

10. The scintillation scanner of claim 8 further comprising a longitudinal feed control ciruit for indexing said scintillation detector means to the next of a series of scanning lines when said detector means has moved at said scanning speed for a predetermined distance without detecting radioactivity concentration above said predetermined level.

11. The scintillation scanner of claim 8, wherein said electrical circuit means includes means for
 1. counting said electrical pulses as said detector means is moved at said scanning speed and stopping said detector means when the number of said electrical pulses counted over a predetermined time reaches a first preset number, and
 2. further counting a second predetermined number $N$ of said electrical pulses when said detector means is stopped, measuring the time interval $T$ needed for counting said $N$ electrical pulses and giving an outpur signal $R$ representing the rate of said electrical pulses, $R = N/T$.

\* \* \* \* \*